(12) United States Patent
Jeong et al.

(10) Patent No.: US 12,464,062 B2
(45) Date of Patent: Nov. 4, 2025

(54) DISPLAY DEVICE

(71) Applicant: Samsung Display Co., LTD., Yongin-si (KR)

(72) Inventors: Gyeongho Jeong, Yongin-si (KR); Jaiku Shin, Yongin-si (KR); Sung Chul Choi, Yongin-si (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 202 days.

(21) Appl. No.: 18/493,012

(22) Filed: Oct. 24, 2023

(65) Prior Publication Data

US 2024/0259489 A1 Aug. 1, 2024

(30) Foreign Application Priority Data

Jan. 27, 2023 (KR) ........................ 10-2023-0010494

(51) Int. Cl.
*H04M 1/02* (2006.01)

(52) U.S. Cl.
CPC ....... *H04M 1/0268* (2013.01); *H04M 1/0214* (2013.01); *H04M 1/0277* (2013.01)

(58) Field of Classification Search
CPC combination set(s) only.
See application file for complete search history.

(56) References Cited

U.S. PATENT DOCUMENTS

| | | | | |
|---|---|---|---|---|
| 11,442,202 B2 * | 9/2022 | Park | ........................ | G02B 1/14 |
| 11,495,760 B2 * | 11/2022 | Jung | ................... | G09G 3/3225 |
| 11,791,235 B2 * | 10/2023 | Ham | ................... | H01L 23/3735 |
| | | | | 361/707 |
| 11,841,745 B2 * | 12/2023 | Baek | ...................... | G06F 3/0412 |
| 11,874,698 B2 * | 1/2024 | Shin | ...................... | G06F 1/1656 |
| 11,935,437 B2 | 3/2024 | Wang et al. | | |
| 2020/0310577 A1 * | 10/2020 | Jeon | ...................... | H10K 59/12 |
| 2022/0059430 A1 * | 2/2022 | Ham | ...................... | H01L 25/18 |
| 2022/0322585 A1 | 10/2022 | Luo et al. | | |
| 2022/0374047 A1 | 11/2022 | Kim et al. | | |
| 2022/0404867 A1 * | 12/2022 | Shin | ...................... | G06F 1/1681 |
| 2022/0418118 A1 * | 12/2022 | Sim | ...................... | G06F 1/1681 |
| 2023/0200114 A1 * | 6/2023 | Park | ...................... | H10K 50/844 |
| | | | | 257/40 |
| 2024/0126344 A1 * | 4/2024 | Kim | ...................... | H10K 59/40 |
| 2024/0152181 A1 * | 5/2024 | Shin | ...................... | G06F 1/1652 |

(Continued)

FOREIGN PATENT DOCUMENTS

| | | |
|---|---|---|
| EP | 3958338 A1 | 2/2022 |
| KR | 102369943 B1 | 3/2022 |
| WO | 2021169987 A1 | 9/2021 |

*Primary Examiner* — Lisa Lea-Edmonds
(74) *Attorney, Agent, or Firm* — CANTOR COLBURN LLP

(57) ABSTRACT

A display device includes: a display panel including a foldable area having flexibility; a first support member disposed under the display panel and including a stretchable portion overlapping the foldable area; a second support member disposed under the first support member and including a first support plate and a second support plate spaced apart from each other; a third support member disposed under the first support member and including a material different from a material of the second support member; and a circuit board contacting a part of the display panel and one surface of the third support member, respectively.

25 Claims, 14 Drawing Sheets

(56) References Cited

U.S. PATENT DOCUMENTS

2024/0176391 A1* 5/2024 Kishimoto ............ G06F 1/1652
2024/0259489 A1* 8/2024 Jeong .................... G06F 1/1637
2024/0284617 A1* 8/2024 Ham ..................... G06F 1/1652
2025/0157364 A1* 5/2025 Yoo ....................... H10K 71/00

* cited by examiner

DISPLAY DEVICE

This application claims priority to Korean Patent Application No. 10-2023-0010494, filed on Jan. 27, 2023, and all the benefits accruing therefrom under 35 U.S.C. § 119, the content of which in its entirety is herein incorporated by reference.

BACKGROUND

1. Field

Embodiments provide generally to a display device. More particularly, embodiments relate to a foldable display device.

2. Description of the Related Art

With the development of information technology, the importance of a display device, which is a connection medium between a user and information, has been highlighted. For example, the use of a display device such as a liquid crystal display device, an organic light emitting display device, a plasma display device, and the like is increasing.

A flexible display device that can be deformed into various shapes has been developed. Unlike a flat panel display, the flexible display device may be folded, bent, or rolled like paper. The flexible display device is easy to carry and can improve user convenience. Recently, among flexible display devices, a foldable display device is in the limelight. The foldable display device may be repeatedly folded and unfolded.

SUMMARY

Embodiments provide a display device having light-weight characteristics.

A display device according to embodiments of the present disclosure includes: a display panel including a foldable area having flexibility; a first support member disposed under the display panel and including a stretchable portion overlapping the foldable area; a second support member disposed under the first support member and including a first support plate and a second support plate spaced apart from each other; a third support member disposed under the first support member and including a material different from a material of the second support member; and a circuit board contacting a part of the display panel and a first surface of the third support member, respectively.

In an embodiment, the third support member does not overlap the second support member in a plan view.

In an embodiment, the third support member may be positioned on the same plane as the second support member.

In an embodiment, the third support member may contact the second support member.

In an embodiment, the display device may further include a tape disposed between the first support member and the third support member and contacting a second surface of the third support member, which is different from the first surface.

In an embodiment, the third support member may at least partially overlap the tape in a plan view.

In an embodiment, an entirety of the third support member may overlap the tape in a plan view.

In an embodiment, the tape may include an insulating material or a conductive material.

In an embodiment, a surface of the third support member may be coated with a conductive material.

In an embodiment, the conductive material may include at least one selected from a group consisting of conductive polymer and a conductive rubber.

In an embodiment, each of the second and third support members may include at least one selected from a group consisting of stainless steel ("SUS"), aluminum (Al), copper (Cu) alloy, and titanium (Ti) alloy.

In an embodiment, a plurality of openings spaced apart from each other may be defined in the stretchable portion.

In an embodiment, each of the plurality of openings may extend in a first direction and the plurality of openings may be arranged along the first direction and a second direction crossing the first direction.

In an embodiment, the circuit board may include a flexible printed circuit board ("FPCB").

A display device according to embodiments of the present disclosure includes: a display panel including a display area including a foldable area having flexibility, a pad area positioned in one side of the display area, and a bending area positioned between the display area and the pad area; a plurality of pad electrodes disposed in the pad area on the display panel; a first support member disposed under the display panel and including a stretchable portion overlapping the foldable area; a second support member disposed under the first support member and including a first support plate and a second support plate spaced apart from each other; a third support member disposed under the first support member and including a metal material different from a metal material of the second support member; and a circuit board including a first part contacting the pad electrodes and a second part directly contacting a first surface of the third support member.

In an embodiment, the third support member does not overlap the second support member in a plan view.

In an embodiment, the third support member may be positioned on the same plane as the second support member.

In an embodiment, the third support member may contact the second support member.

In an embodiment, the display device may further include: a tape disposed between the first support member and the third support member and contacting a second surface of the third support member, which is different from the first surface.

In an embodiment, the third support member at least partially overlaps the tape in a plan view.

In an embodiment, an entirety of the third support member may overlap the tape in a plan view.

In an embodiment, the tape may include an insulating material or a conductive material.

In an embodiment, a surface of the third support member may be coated with a conductive material.

In an embodiment, the conductive material may include at least one selected from a group consisting of conductive polymer and a conductive rubber.

In an embodiment, each of the second and third support members may include at least one selected from a group consisting of stainless steel, aluminum, copper alloy, and titanium alloy.

A display device according to embodiments of the present disclosure includes: a display panel including a foldable area having flexibility; a first support member disposed under the display panel and including a stretchable portion overlapping the foldable area; a second support member disposed under the first support member and including a first support plate and a second support plate spaced apart from each other; a third support member disposed under the first support member and including a metal material different from a metal material of the second support member; and a circuit board contacting one surface of the third support member. Accordingly, to secure the light weight characteristics of the display device can be possible. In addition, the visibility of a part to which the circuit board is attached can be effectively improved.

BRIEF DESCRIPTION OF THE DRAWINGS

Illustrative, non-limiting embodiments will be more clearly understood from the following detailed description in conjunction with the accompanying drawings.

DETAILED DESCRIPTION

Figure 1:
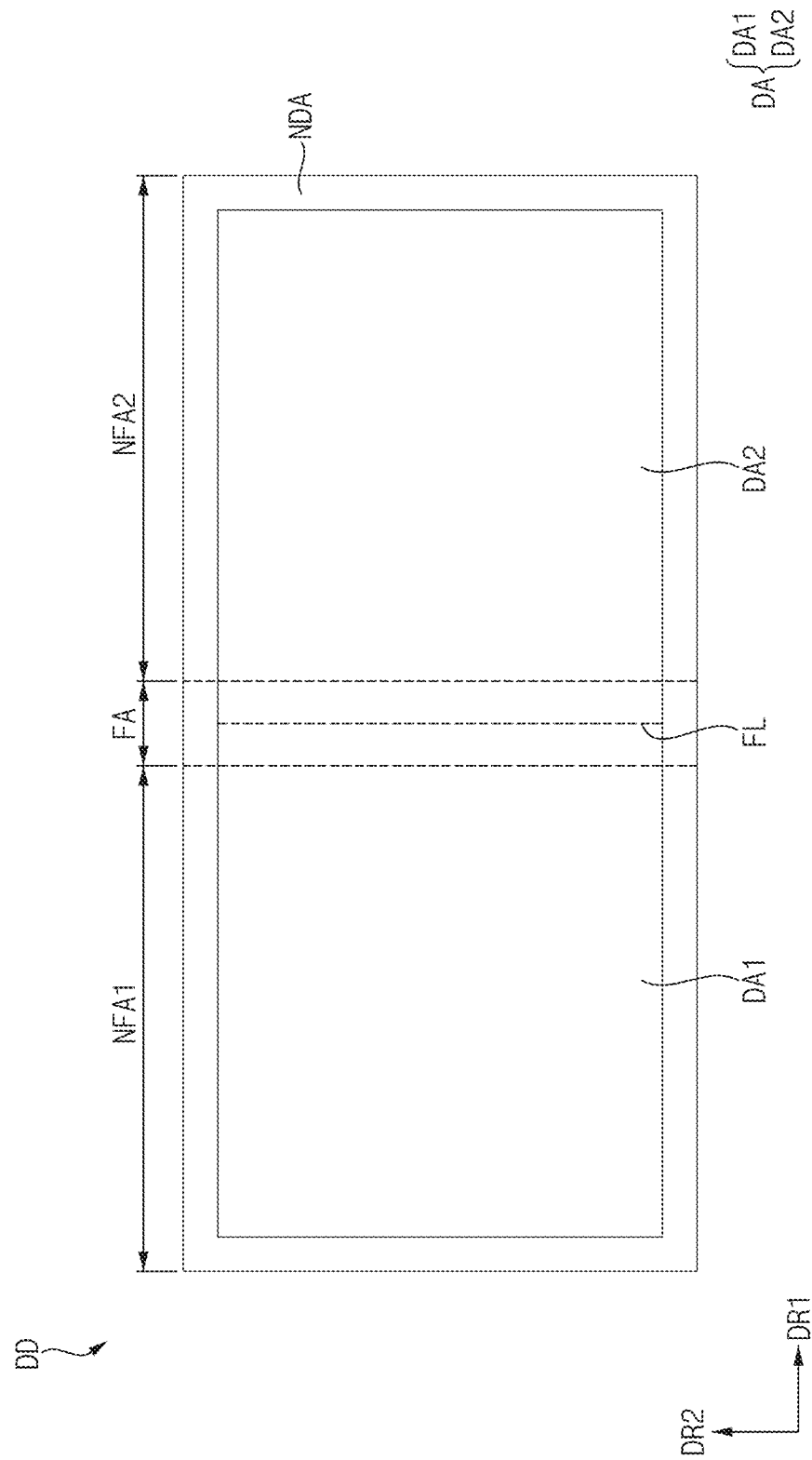
FIG. 1 is a plan view illustrating a display device according to embodiments.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Hereinafter, a display device according to embodiments of the present disclosure will be explained in detail with reference to the accompanying drawings. The same reference numerals are used for the same components in the drawings, and redundant descriptions of the same components will be omitted.

Figure 2:
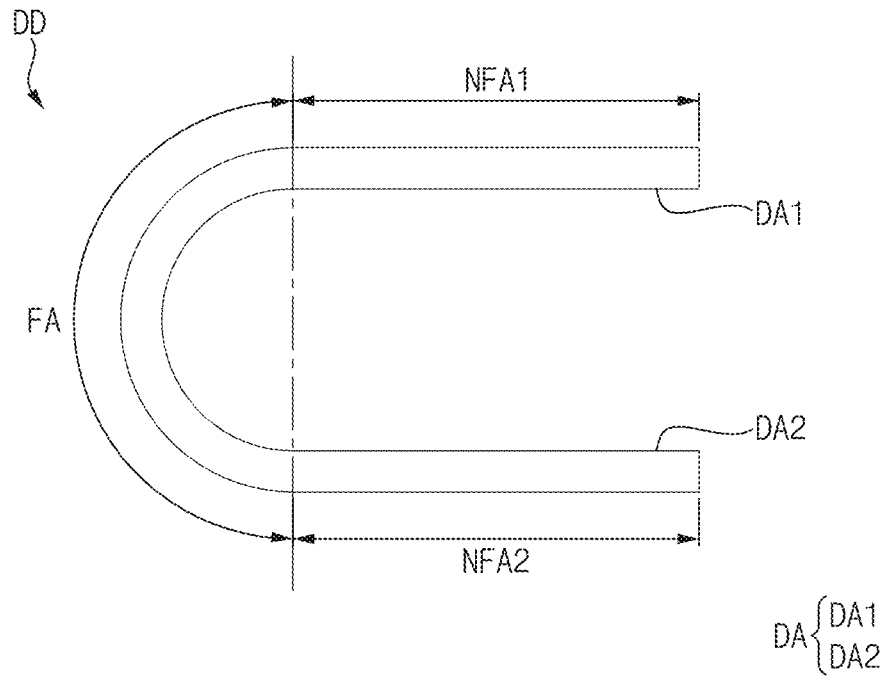
FIGS. 2 and 3 are cross-sectional views illustrating a folded state of the display device of FIG. 1.
Figure 3:
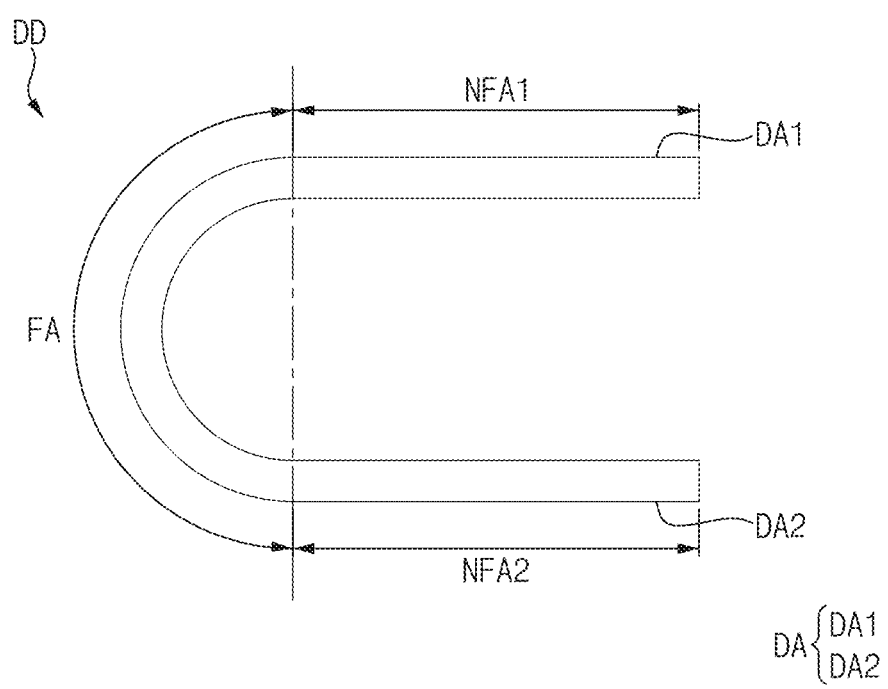

FIG. 1 is a plan view illustrating a display device according to embodiments. FIGS. 2 and 3 are cross-sectional views illustrating a folded state of the display device of FIG. 1. As used herein, the "plan view" is a view in a third direction DR3 perpendicular to the first direction DR1 and the second direction DR2.

Referring to FIGS. 1, 2, and 3, a display device DD according to an embodiment of the present disclosure may be divided into a display area DA and a non-display area NDA. The non-display area NDA may be positioned around the display area DA. In an embodiment, for example, the non-display area NDA may surround at least a part of the display area DA. The display area DA may be an area capable of displaying an image by generating light or adjusting transmittance of light provided from an external light source. The non-display area NDA may be an area not displaying an image.

At least a part of the display device DD may be flexible, and a flexible part (i.e., a foldable area FA) of the display device DD may be folded. That is, the display area DA may include the foldable area FA that can be bent by an external force to fold the display device DD, and first and second non-folding areas NFA1 and NFA2 adjacent to at least one side of the foldable area FA and not being folded. In an embodiment, for example, the foldable area FA may have a folding line FL extending along a second direction DR2. Here, the non-folding area is referred to as a non-folding area, but this is for convenience of description. The expression "non-folding" includes not only a hard case without flexibility but also a case that is flexible but not folded due to flexibility smaller than the foldable area FA.

The display area DA may be divided into a first display area DA1 and a second display area DA2. Specifically, the first display area DA1 and the second display area DA2 may be adjacent to each other in the second direction DR2. The first display area DA1 and the second display area DA2 may be continuously connected to substantially form one display area DA. In an embodiment, for example, when the display area DA is folded along the folding line FL, as shown in FIG. 2, the display device DD may have an in-folding structure so that the first display area DA1 and the second display area DA2 face each other. Alternatively, when the display area DA is folded along the folding line FL, as shown in FIG. 3, the display device DD may have an out-folding structure in which the first display area DA1 and the second display area DA2 are disposed outside.

In addition, although the display device DD is illustrated as having one foldable area FA in FIG. 1, the display device DD according to an embodiment of the present disclosure is not limited to having one foldable area FA. In an embodiment, for example, the display device DD may be folded multiple times or may have a plurality of foldable areas to implement a rollable display device.

Figure 4:
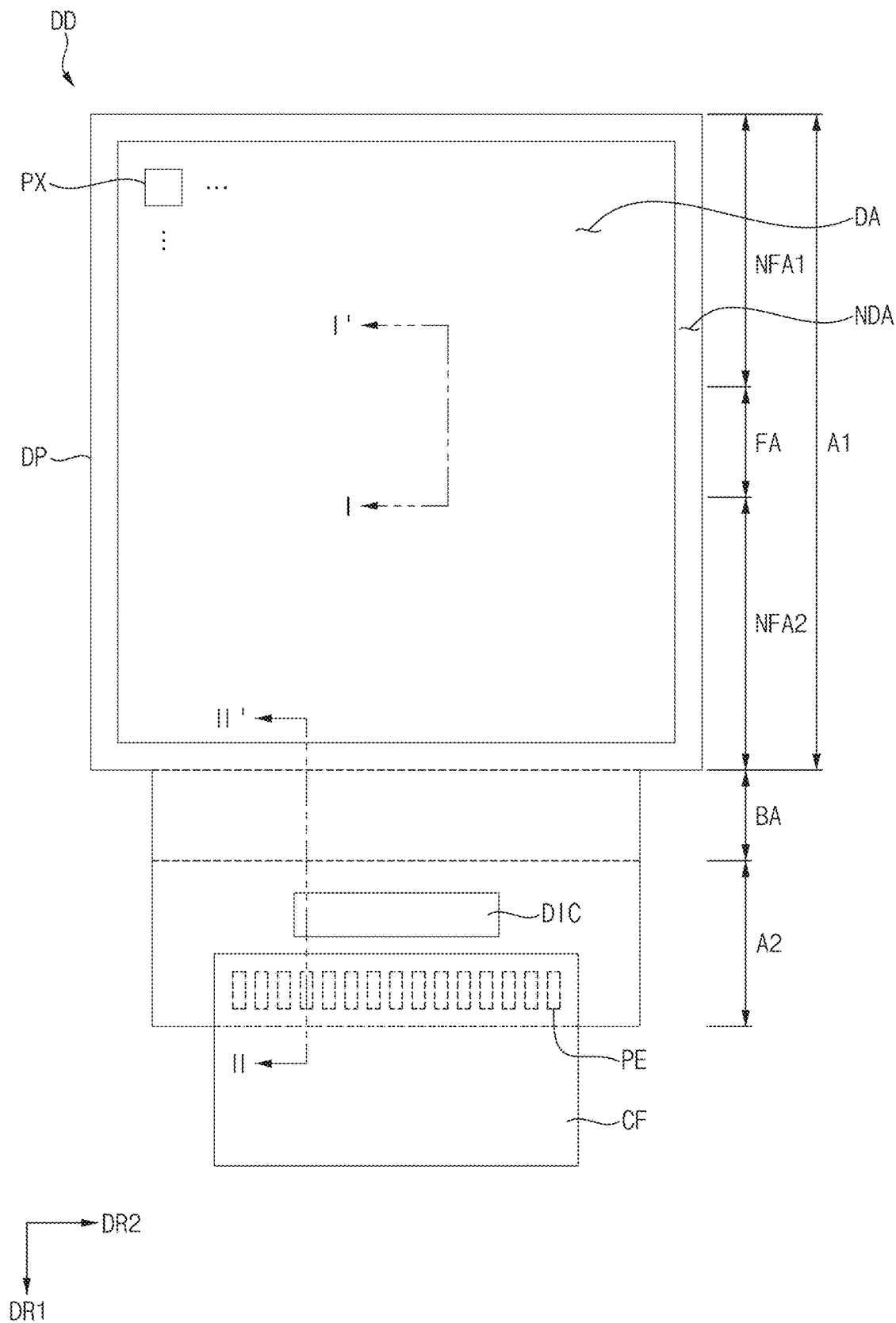
FIG. 4 is a plan view illustrating a display panel, a driving integrated circuit, and a circuit board included in the display device of FIG. 1.

FIG. 4 is a plan view illustrating a display panel, a driving integrated circuit, and a circuit board included in the display device of FIG. 1. In an embodiment, for example, the display device DD of FIG. 4 may indicate a state before a display panel DP is bent.

Referring to FIG. 4, the display device DD according to an embodiment of the present disclosure may include the display panel DP, a driving integrated circuit DIC, pad electrodes PE, and a circuit board CF.

As described above, the display device DD may be divided into the display area DA and the non-display area NDA. As the display device DD is divided into the display area DA and the non-display area NDA, the display panel DP may include the display area DA and the non-display area NDA.

A first panel area A1 may include the display area DA and a part of the non-display area NDA. In an embodiment, for example, the display area DA of the first panel area A1 may include the foldable area FA, the first non-folding area NFA1, and the second non-folding area NFA2. Another part of the non-display area NDA may include a bending area BA and a second panel area A2.

The second panel area A2 may be spaced apart from one side of the display area DA in a first direction DR1 parallel to the upper surface of the display panel DP. The second panel area A2 may be defined as a pad area. The bending area BA may be positioned between the display area DA and the second panel area A2 in a plan view.

A width (i.e., the length in the second direction DR2) of each of the bending area BA and the second panel area A2 may be less than a width (i.e., the length in the second direction DR2) of the first panel area A1.

A plurality of pixel structures PX may be disposed in the display area DA. Each of the pixel structures PX may include a transistor and a light emitting element electrically connected to the transistor. Each of the pixel structures PX may emit light. As each of the pixel structures PX emits light, the display area DA may display an image. In an embodiment, for example, the pixel structures PX may be arranged in a matrix form along the first direction DR1 and the second direction DR2 crossing the first direction DR1.

Lines connected to the pixel structures PX may be further disposed in the display area DA. In an embodiment, for example, the lines may include a data signal line, a gate signal line, and a power line.

A driver for driving the pixel structures PX may be disposed in the non-display area NDA. In an embodiment, for example, the driver may include a data driver, a gate driver, a light emitting driver, a power voltage generator, a timing controller, and the like. The pixel structures PX may emit light based on signals transmitted from the driver.

The driving integrated circuit DIC may be disposed in the second panel area A2 on the display panel DR The driving integrated circuit DIC may convert a digital data signal among driving signals into an analog data signal and provide the converted analog data signal to the plurality of pixel structures PX. In an embodiment, for example, the driving integrated circuit DIC may be a data driver.

The plurality of pad electrodes PE may be disposed in the second panel area A2 on the display panel DP The pad electrodes PE may be spaced apart from each other in the second direction DR2. Here, the second direction DR2 may be a direction substantially parallel to the upper surface of the display panel DP Some of the pad electrodes PE may be connected to the driving integrated circuit DIC through a line, and the remaining part of the pad electrodes PE may be connected to the pixel structures PX through a line. Each of the pad electrodes PE may include a metal, an alloy, a metal nitride, a conductive metal oxide, a transparent conductive material, and/or the like. These may be used alone or in combination with each other.

The circuit board CF may be disposed on a part of the display panel DP. The circuit board CF may contact a part of the display panel DP In an embodiment, for example, one end of the circuit board CF may be electrically connected to the pad electrodes PE and the other end of the circuit board CF may be electrically connected to an external device. That is, the driving signal and driving voltage generated from the external device may be provided to the driving integrated circuit DIC and the pixel structures PX through the circuit board CF and the pad electrodes PE. In an embodiment, for example, the circuit board CF may include a flexible printed circuit board ("FPCB"), a printed circuit board ("PCB"), a flexible flat cable ("FFC"), and/or the like. In an embodiment, the circuit board CF may include a flexible printed circuit board.

In FIG. 1, the driver integrated circuit DIC is illustrated as being disposed in a chip on plastic ("COP") method or a chip on glass ("COG") method, but embodiments of the present disclosure are not limited thereto. In another embodiment, for example, the driving integrated circuit DIC may be arranged in a chip on film ("COF") method.

In this specification, a plane may be defined as the first direction DR1 and the second direction DR2 crossing the first direction DR1. In an embodiment, for example, the first direction DR1 may be perpendicular to the second direction DR2.

Figure 5:
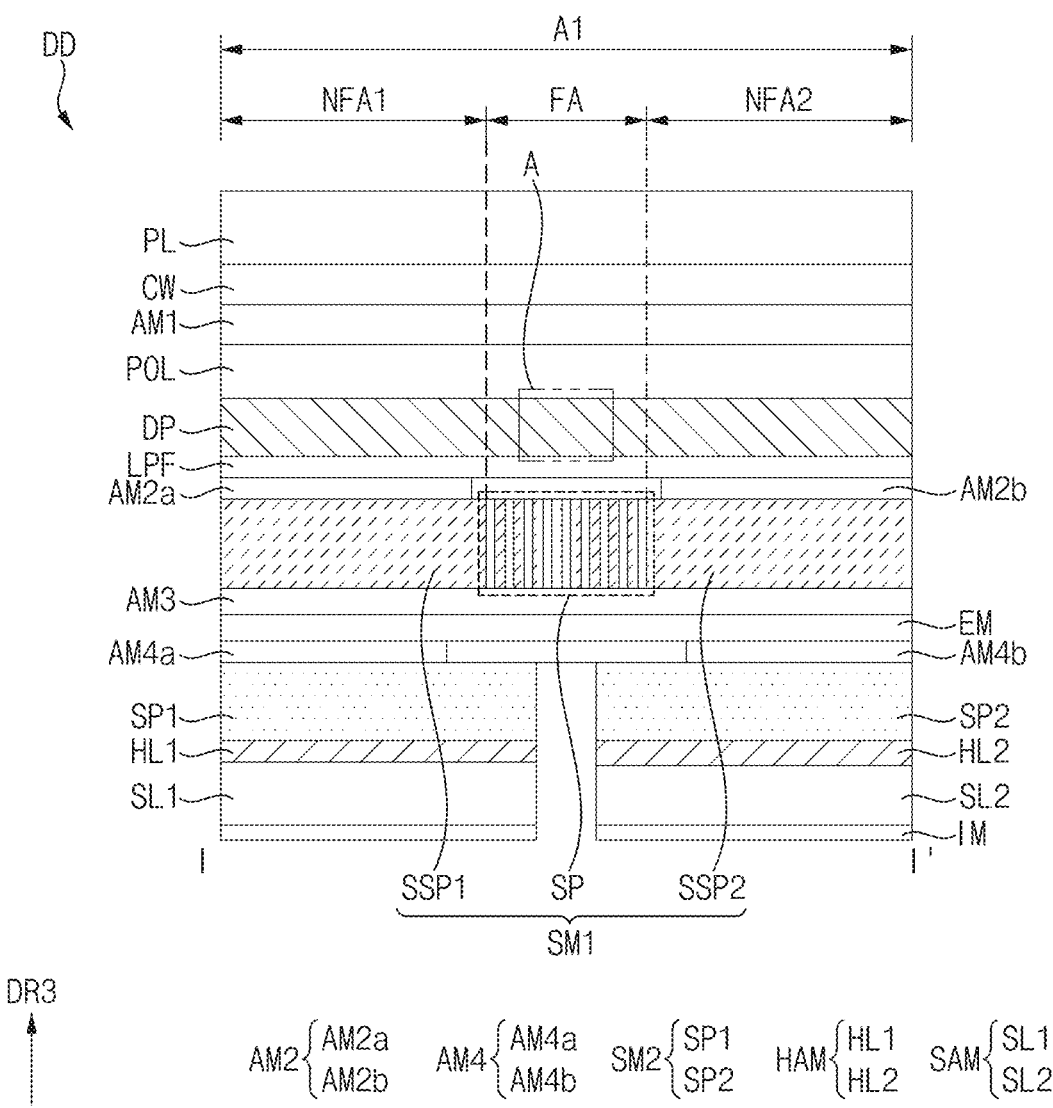
FIG. 5 is a cross-sectional view taken along line I-I' of FIG. 4.
Figure 6:
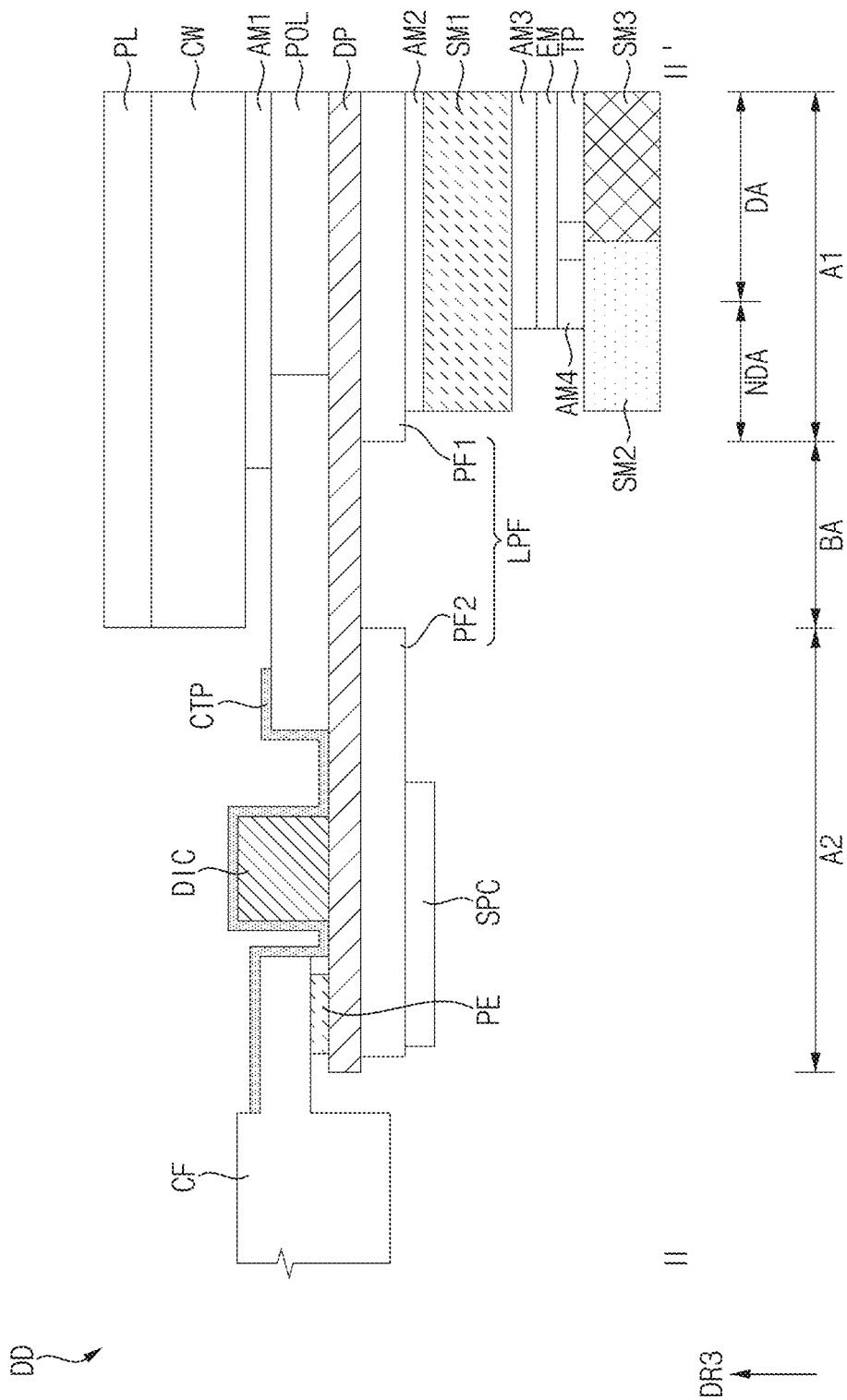
FIG. 6 is a cross-sectional view taken along line II-II' of FIG. 4.
Figure 7:
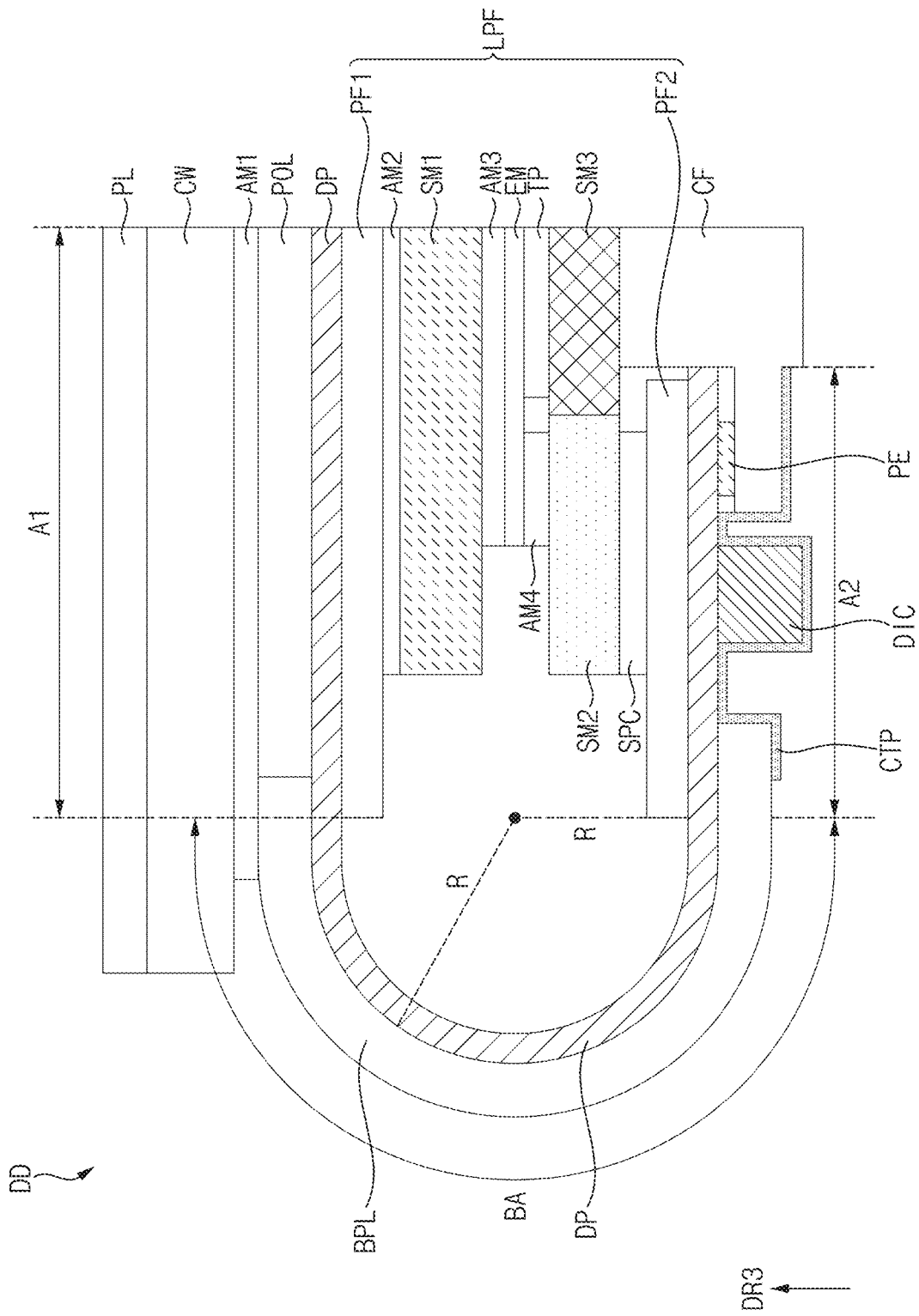
FIG. 7 is a cross-sectional view illustrating a bent shape of the display panel of FIG. 6.

FIG. 5 is a cross-sectional view taken along line I-I' of FIG. 4. FIG. 6 is a cross-sectional view taken along line II-II' of FIG. 4. FIG. 7 is a cross-sectional view illustrating a bent shape of the display panel of FIG. 6. In an embodiment, for example, FIG. 5 illustrates a state in which the display device DD is unfolded. In addition, FIG. 6 illustrates a state before the bending area BA of the display device DD is bent and FIG. 7 illustrates a state where the bending area BA of the display device DD is bent. In the display device DD, the bending area BA may be provided in a bent state.

Referring to FIG. 5, the display device DD according to an embodiment may include a window protection layer PL, a cover window CW, a first adhesive member AM1, a polarization member POL, the display panel DP, the pad electrodes PE, the driving integrated circuit DIC, the circuit board CF, a spacer SPC, a cover tape CTP, a tape TP, a lower protective film LPF, a bending protection layer BPL, a second adhesive member AM2, a first support member SM1, a third adhesive member AM3, an elastic member EM, a fourth adhesive member AM4, a second support A member SM2, a third support member SM3, a heat dissipation member HAM, a shock absorbing member SAM, and an insulating member IM.

The polarization member POL may be disposed on the display panel DP. The display panel DP may include a plurality of pixels (e.g., the plurality of pixels PX in FIG. 4) that generate light. The polarization member POL may block external light incident on the display panel DP from the outside.

The cover window CW may be disposed on the polarization member POL. The cover window CW may protect the display panel DP. The cover window CW may have a transmission portion corresponding to the display area DA.

The cover window CW may include a polymer material, a glass thin film, or the like to enable bending.

In an embodiment, for example, the cover window CW may include ultra-thin glass ("UTG"). The ultra-thin film glass may be tempered to have a predetermined stress profile therein. The ultra-thin glass can better prevent crack generation, propagation of cracks, damage, and the like due to external impact than before tempering. The ultra-thin glass may have various stresses for each area through a tempering process.

In an embodiment, for example, the ultra-thin glass of the cover window CW may be chemically tempered thin glass to have high strength. However, embodiments of the present disclosure are not limited thereto, and the ultra-thin glass of the cover window CW may be a thermally tempered thin film glass in another embodiment.

When the glass is composed of an ultra-thin film or a thin film, the glass may have a flexible characteristic and may have a characteristic of being bent, folded, or rolled. In an embodiment, for example, the window member CW may include glass such as soda lime glass, alkali alumino silicate glass, borosilicate glass, lithium alumina silicate glass, and the like. These may be used alone or in combination with each other. However, embodiments of the present disclosure are not limited thereto, and the cover window CW may include various types of glass in another embodiment.

The first adhesive member AM1 may be disposed between the polarization member POL and the cover window CW. The first adhesive member AM1 may attach the polarization member POL and the cover window CW to each other. In an embodiment, for example, the first adhesive member AM1 may include an optical clear adhesive ("OCA"), a pressure sensitive adhesive ("PSA"), a photocurable resin, a thermosetting resin, or the like. These may be used alone or in combination with each other.

The window protection layer PL may be disposed on the cover window CW. The window protection layer PL may perform at least one function of preventing scattering, shock absorption, stamping prevention, fingerprint prevention, and glare prevention of the cover window CW. The window protective layer PL may include a transparent polymer film. In an embodiment, for example, the window protective layer PL may include epoxy resin, polyurethane, polyester, polyethylene terephthalate, polyethylene naphthalate, polyimide, polyarylate, polycarbonate, polymethyl methacrylate, ethyl vinyl acetate, polyamide resin, and/or the like. These may be used alone or in combination with each other.

The first support member SM1 may be disposed under the display panel DR The first support member SM1 may overlap the first panel area A1. The first support member SM1 may serve to support the display panel DR In addition, the first support member SM1 may serve to assist folding of the display panel DP In addition, the first support member SM1 may prevent foreign substances from being introduced into the display panel DP from the outside. In addition, the first support member SM1 may emit or disperse heat generated from the display panel DR The first support member SM1 may be formed with a relatively thin thickness. In an embodiment, for example, the thickness of the first support member SM1 may be about 80 micrometers. Accordingly, the light weight characteristics of the display device DD may be secured.

The rigidity of the first support member SM1 may be greater than the rigidity of the display panel DR Accordingly, the first support member SM1 may prevent the display panel DP from being deformed due to a user's external force or the like.

In an embodiment, for example, the first support member SM1 may include a first support part SSP1, a second support part SSP2, and a stretchable part SP. The stretchable part SP may be positioned between the first support part SSP1 and the second support part SSP2. The stretchable part SP may overlap the foldable area FA, the first support part SSP1 may overlap the first non-folding area NFA1, and the second support part SSP2 may overlap the second non-folding area NFA2. Accordingly, the first and second support parts SSP1 and SSP2 may support a part of the display panel DP overlapping the first and second non-folding areas NFA1 and NFA2, and the stretchable portion SP may help the display panel DP to be folded.

The stretchable portion SP may have elasticity in response to folding and unfolding of the display device DD. However, although FIG. 5 illustrates one stretchable part SP, embodiments of the present disclosure are not limited thereto. In another embodiment, for example, a plurality of stretchable parts SP may be formed. A detailed description of the stretchable part SP will be described later.

In an embodiment, the first support member SM1 may include metal or alloy. In an embodiment, for example, the first support member SM1 may include stainless steel (SUS), aluminum, a copper alloy, a magnesium alloy, a titanium alloy, and/or the like. In another embodiment, the first support member SM1 may include glass or plastic. In an embodiment, for example, the first support member SM1 may include carbon fiber reinforce plastic ("CFRP") or glass fiber reinforce plastic ("GFRP"). However, embodiments of the present disclosure are not limited thereto, and the first support member SM1 may include various materials.

The lower protective film LPF may be disposed under the display panel DP. Specifically, the lower protective film LPF may include a first protective film PF1 overlapping the first panel area A1 and a second protective film PF2 overlapping the second panel area A2. That is, the lower protective film LPF may not be disposed in the bending area BA. The lower protective film LPF may protect the lower surface of the display panel DP The lower protective film LPF may include an inorganic material and/or an organic material. In an embodiment, for example, the lower protective film LPF may include an organic material such as photoresist, polyacrylic resin, polyimide resin, polyamide resin, siloxane resin, acrylic resin, epoxy resin, and/or the like. These may be used alone or in combination with each other.

An adhesive layer may be disposed between the display panel DP and the lower protective film LPF. The adhesive layer may attach the lower protective film LPF to the lower surface of the display panel DP. A part of the adhesive layer may overlap the bending area BA.

The second adhesive member AM2 may be disposed between the first support member SM1 and the lower protective film LPF. The second adhesive member AM2 may include a first adhesive layer AM2a and a second adhesive layer AM2b spaced apart from each other in the second direction DR2. Each of the first adhesive layer AM2a and the second adhesive layer AM2b may not overlap the foldable area FA. The second adhesive member AM2 may attach the display panel DP and the lower protective film LPF to each other. In an embodiment, for example, the second adhesive member AM2 may include an optically transparent adhesive, a pressure sensitive adhesive, a photocurable resin, a thermosetting resin, and/or the like. These may be used alone or in combination with each other.

The elastic member EM may be disposed under the first support member SM1. The elastic member EM may overlap the first panel area A1. Specifically, the elastic member EM may be disposed between the first support member SM1 and the second support member SM2. While the display device DD repeatedly performs folding and unfolding, the elastic member EM may prevent foreign substances from penetrating the stretchable and stretchable portion SP. In addition, while the display device DD repeatedly performs folding and unfolding, the elastic member EM may be stretched and contracted so as not to expose the stretchable portion SP.

In an embodiment, for example, the elastic member EM may include an elastic polymer having a relatively high elasticity or a relatively high restoring force. In an embodiment, for example, the elastic member EM may include an elastic material such as silicone, urethane, thermoplastic polyurethane ("TPU"), and the like. These may be used alone or in combination with each other.

The third adhesive member AM3 may be disposed between the first support member SM1 and the elastic member EM. The third adhesive member AM3 may attach the first support member SM1 and the elastic member EM to each other. In an embodiment, for example, the third adhesive member AM3 may include an optically transparent adhesive, a pressure sensitive adhesive, a photocurable resin, a thermosetting resin, or the like. These may be used alone or in combination with each other.

The second support member SM2 may be disposed under the first support member SM1. The second support member SM2 may overlap the first panel area A1. The second support member SM2 may include a first support plate SP1 and a second support plate SP2 spaced apart from each other. Each of the first support plate SP1 and the second support plate SP2 may at least partially overlap the foldable area FA.

In an embodiment, for example, when the display device DD is folded, a distance between the first support plate SP1 and the second support plate SP2 may increase. The second support member SM2 may prevent the stretchable portion SP of the first supporting member SM1 from being pressed.

In an embodiment, the second support member SM2 may include metal or alloy. In an embodiment, for example, the second support member SM2 may include stainless steel, aluminum, a copper alloy, a magnesium alloy, a titanium alloy, and/or the like. These may be used alone or in combination with each other. However, embodiments of the present disclosure are not limited thereto.

The fourth adhesive member AM4 may be disposed between the elastic member EM and the second support member SM2. The fourth adhesive member AM4 may attach the elastic member EM and the second support member SM2. The fourth adhesive member AM4 may include a first adhesive layer AM4a and a second adhesive layer AM4b spaced apart from each other. The first adhesive layer AM4a may attach the elastic member EM and the first support plate SP1 to each other, and the second adhesive layer AM4b may attach the elastic member EM and the second support plate SP2 to each other. In an embodiment, for example, the fourth adhesive member AM4 may include an optically transparent adhesive, a pressure sensitive adhesive, a photocurable resin, a thermosetting resin, or the like. These may be used alone or in combination with each other.

The heat dissipation member HAM may be disposed under the second support member SM2. The heat dissipation member HAM may overlap the first panel area A1. The heat dissipation member HAM may include a first heat dissipation layer HL1 and a second heat dissipation layer HL2 spaced apart from each other. In an embodiment, for example, each of the first heat dissipation layer HL1 and the second heat dissipation layer HL2 may at least partially overlap the foldable area FA.

The heat dissipation member HAM may include a material having high thermal conductivity. In an embodiment, for example, the heat dissipation member HAM may include aluminum (Al) or copper (Cu). These may be used alone or in combination with each other. Alternatively, the heat dissipation member HAM may be omitted.

The shock absorbing member SAM may be disposed under the heat dissipation member HAM. The shock absorbing member SAM may overlap the first panel area A1. The shock absorbing member SAM may include a first cushion layer SL1 and a second cushion layer SL2 spaced apart from each other. Each of the first cushion layer SL1 and the second cushion layer SL2 may partially overlap the foldable area FA.

The shock absorbing member SAM may protect the display panel DP from external impact. In addition, the shock absorbing member SAM may include a material having ductility so that the display device DD can be easily folded. In an embodiment, for example, the shock absorbing member SAM may include a foam material such as polyurethane foam, polystyrene foam, and the like. These may be used alone or in combination with each other.

The insulating member IM may be disposed under the shock absorbing member SAM. The insulating member IM may overlap the first panel area A1. In an embodiment, for example, the insulating member IM may be in the form of a film or tape. The insulating member IM may prevent rattle from occurring in the display device DD.

As described above, since the display device DD according to an embodiment of the present disclosure can be folded or unfolded, each of the window protection layer PL, the cover window CW, the polarization member POL, the display panel DP, the lower protective film LPF, and the first support member SM1 may have flexibility.

The driving integrated circuit DIC may be disposed on the display panel DP. The driving integrated circuit DIC may overlap the second panel area A2.

As illustrated in FIG. 7, the bending area BA may be bent so that the second panel area A2 is positioned under the first panel area A1 along an imaginary axis. Accordingly, the driving integrated circuit DIC may be disposed under the first panel area A1. That is, the first panel area A1 and the second panel area A2 may be positioned on different planes. The bending area BA may have a predetermined curvature R.

The bending protection layer BPL may be disposed on the display panel DP. The bending protection layer BPL may overlap a part of the first panel area A1, a part of the second panel area A2, and the bending area BA. The bending protection layer BPL may be bent together with the bending area BA. The bending protection layer BPL may raise the neutral plane of the display device DD in the bending area BA.

The bending protection layer BPL may include a photocurable resin and/or a thermosetting resin. In an embodiment, for example, the bending protection layer BPL may include epoxy resin, amino resin, phenol resin, urea resin, melamine resin, unsaturated polyester resin, polyurethane resin, polyimide resin, and/or the like. These may be used alone or in combination with each other.

The spacer SPC may be disposed under the second protective film PF2. As illustrated in FIG. 7, the spacer SPC may compensate for a step difference. Alternatively, the spacer SPC may include an adhesive material, and the spacer SPC may be fixed to the lower surface of the second support member SM2. In an embodiment, for example, the spacer SPC may include an organic insulating material such as photoresist, polyacrylic resin, polyimide resin, polyamide resin, siloxane resin, acrylic resin, epoxy resin, and the like. These may be used alone or in combination with each other.

In an embodiment, the third support member SM3 including a metal material different from a metal material of the second support member SM2 may be disposed under the elastic member EM. The third support member SM3 may overlap the first panel area A1. In an embodiment, for example, the third support member SM3 may include metal or alloy. In an embodiment, for example, the third support member SM3 may include stainless steel, aluminum, a copper alloy, a magnesium alloy, a titanium alloy, and/or the like. These may be used alone or in combination with each other. However, embodiments of the present disclosure are not limited thereto.

In an embodiment, the third support member SM3 may be positioned on the same plane as the second support member SM2. That is, the third support member SM3 may not overlap the second support member SM2 in a plan view.

In an embodiment, the third support member SM3 may contact the second support member SM2. Specifically, the third support member SM3 may directly contact the second support member SM2.

In an embodiment, a surface of the third support member SM3 may be coated with a conductive material. In an embodiment, for example, the conductive material may include a conductive polymer or conductive rubber. These may be used alone or in combination with each other. However, embodiments of the present disclosure are not limited thereto.

The tape TP may be disposed between the elastic member EM and the third support member SM3. The tape TP may attach the elastic member EM and the third support member SM3. In an embodiment, the tape TP may include an insulating material. In this case, the tape TP may include the same material as the first, second, third, and fourth adhesive members AM1, AM2, AM3, and AM4. In another embodiment, the tape TP may include a conductive material. In an embodiment, for example, the tape TP may include a conductive material such as an anisotropic conductive film.

The circuit board CF may be disposed on a part of the display panel DP. In an embodiment, as illustrated in FIG. 7, a first part of the circuit board CF may contact the pad electrodes PE and a second part of the circuit board CF may contact one surface of the third support member SM3.

The cover tape CTP may be disposed on the driving integrated circuit DIC. The cover tape CTP may be disposed on a part of the bending protection layer BPL and a part of the circuit board CF. In the second panel area A2 adjacent to the bending area BA, one end of the cover tape CTP may overlap the bending protection layer BPL, and the other end of the cover tape CTP may overlap the circuit board CF in a plan view. That is, the cover tape CTP may cover the driving integrated circuit DIC. The cover tape CTP may shield electromagnetic waves emitted from the driving integrated circuit DIC in the second panel area A2. Accordingly, electromagnetic interference ("EMI") caused by the electromagnetic wave and an external device may be reduced. In an embodiment, for example, the cover tape CTP may include a synthetic resin such as PET and the like.

The display device DD according to embodiments of the present disclosure includes the display panel DP including the foldable area FA having flexibility, the first support member SM1 disposed under the display panel DP and including the stretchable portion SP overlapping the foldable area FA, the second support member SM2 disposed under the first support member SM1 and including the first support plate SP1 and the second support plate SP2 spaced apart from each other, the third support member SM3 disposed under the first support member SM1 and including a metal material different from a metal material of the second support member SM2, and the circuit board CF contacting one surface of the third support member SM3. Accordingly, to secure the light weight characteristics of the display device DD can be possible. In addition, the visibility of a part to which the circuit board CF is attached can be effectively improved.

Figure 8:
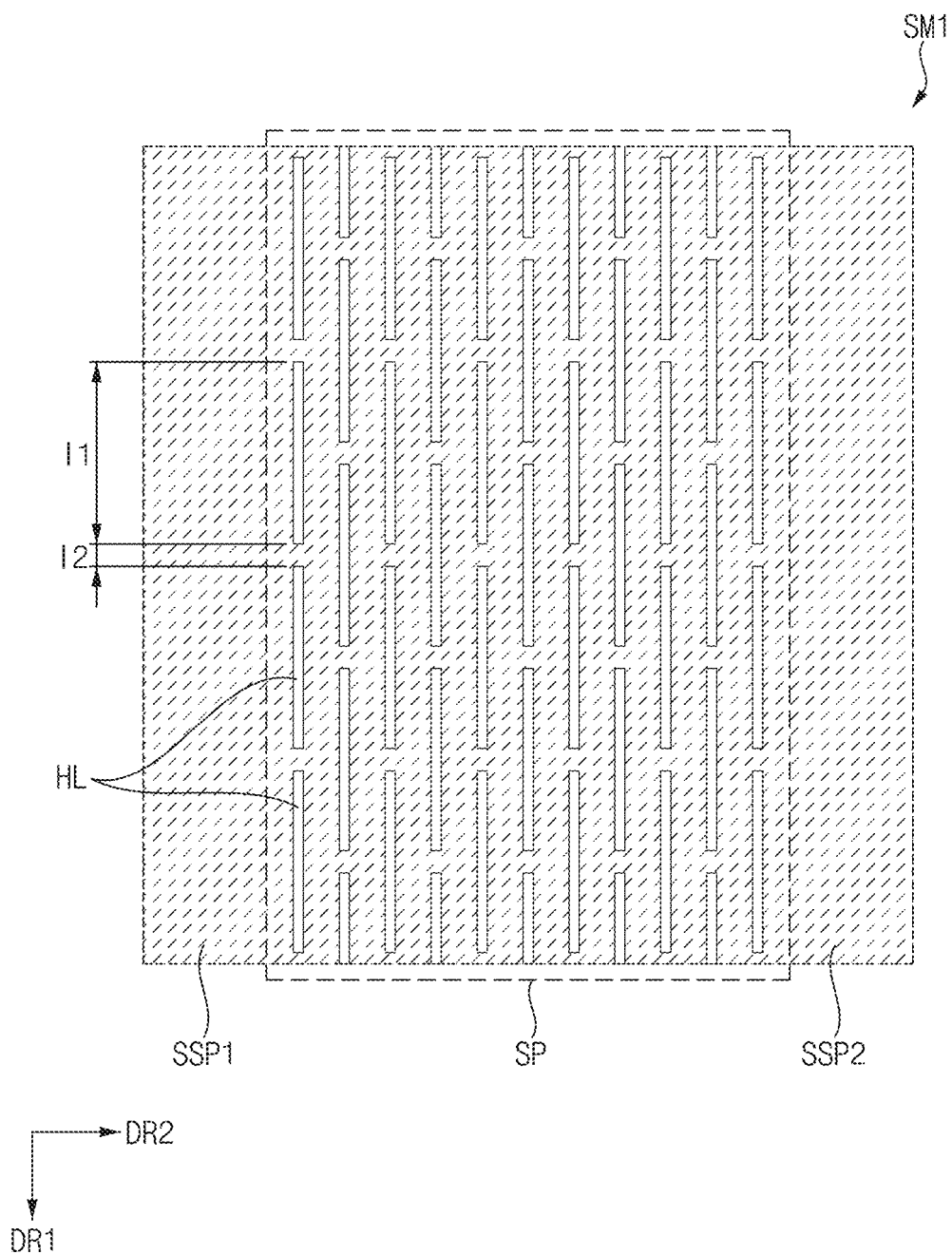
FIG. 8 is a plan view illustrating a part of a first support member of FIG. 5.

FIG. 8 is a plan view illustrating a part of a first support member of FIG. 5.

Referring to FIG. 8, the first support member SM1 may include the first support part SSP1, the second support part SSP2, and the stretchable part SP. In an embodiment, a plurality of openings HL spaced apart from each other may be defined in the stretchable portion SP. The plurality of openings HL may be formed by removing a part of the stretchable portion SP through an etching process or a punching process.

Each of the plurality of openings HL may have a shape extending in the first direction DR1. That is, the long axis of each of the plurality of openings HL may be parallel to the first direction DR1.

The plurality of openings HL may have the same planar shape. In an embodiment, for example, each of the plurality of openings HL may have a rectangular planar shape. However, embodiments of the present disclosure are not limited thereto, and each of the plurality of openings HL may have various planar shapes.

The plurality of openings HL may be arranged along the second direction DR2. In an embodiment, for example, each of the plurality of openings HL may have a predetermined length l1. In addition, the plurality of openings HL arranged in the same column may be spaced apart by a predetermined distance l2. The plurality of openings HL arranged in the same column may be arranged parallel to or offset from the plurality of openings HL arranged in another adjacent column.

Figure 9:
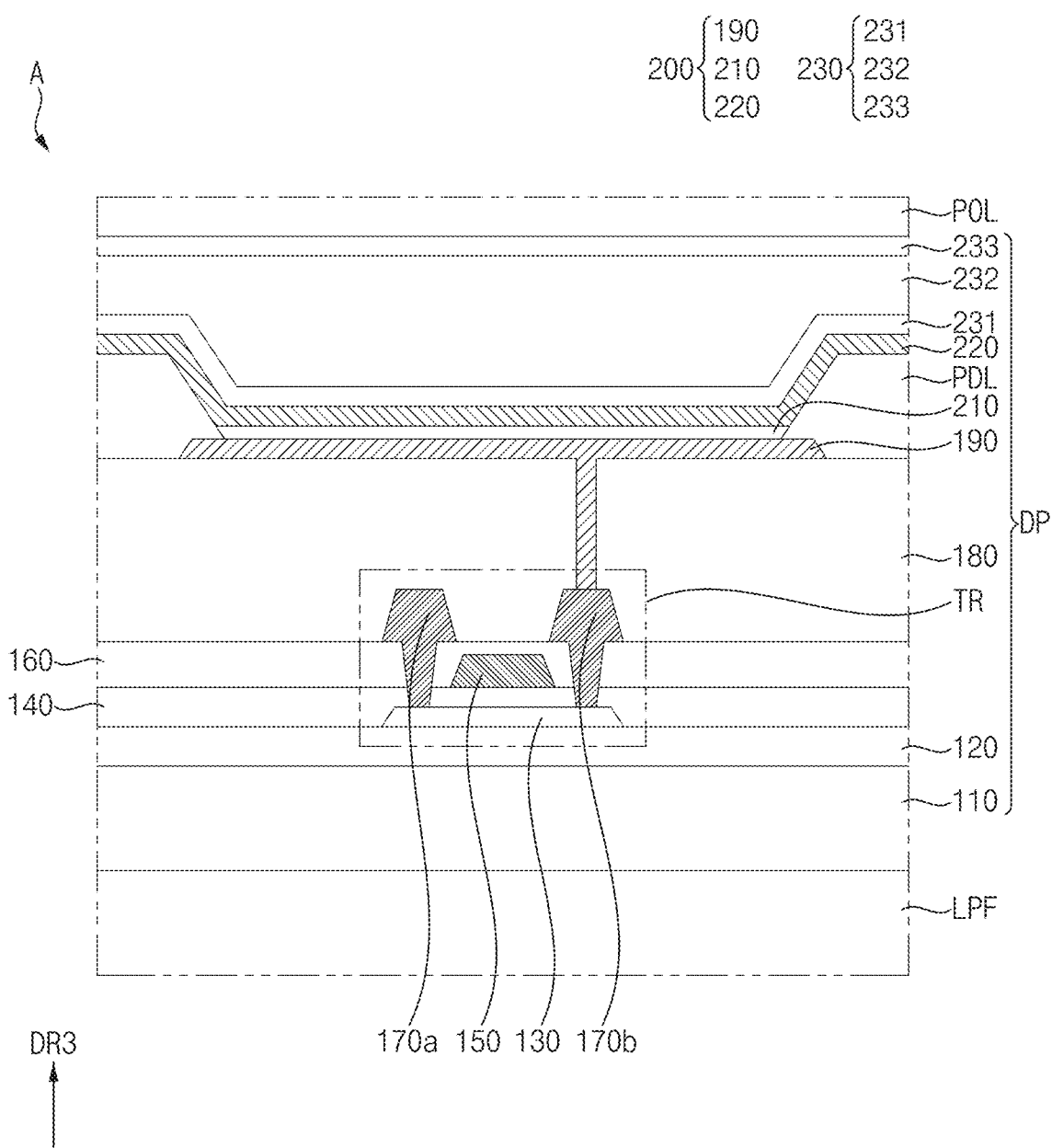
FIG. 9 is an enlarged cross-sectional view of area A of FIG. 5.

FIG. 9 is an enlarged cross-sectional view of area A of FIG. 5. In an embodiment, for example, FIG. 9 is an enlarged cross-sectional view of a part of the display panel DP Referring to FIG. 9, the display panel DP of the display device DD according to an embodiment of the present disclosure may include a substrate 110, a buffer layer 120, a gate insulating layer 140, a transistor TR, an interlayer-insulating layer 160, a planarization layer 180, a pixel defining layer PDL, a light emitting element 200, and an encapsulation layer 230.

Here, the transistor TR may include an active layer 130, a gate electrode 150, a source electrode 170a, and a drain electrode 170b, the light emitting element 200 may include a lower electrode 190, a light emitting layer 210, and an upper electrode 220, and the encapsulation layer 230 may include a first thin film encapsulation layer 231, a second thin film encapsulation layer 232, and a third thin film encapsulation layer 233.

The lower protective film LPF may be disposed under the substrate 110. The lower protective film LPF may protect the lower part of the display panel DP The substrate 110 may include a transparent material or an opaque material. The substrate 110 may include a flexible transparent resin substrate. An example of a transparent resin substrate that can be used as the substrate 110 may be a polyimide substrate. Alternatively, the substrate 110 may include a quartz substrate, a synthetic quartz substrate, a calcium fluoride substrate, a soda lime glass substrate, an alkali-free glass substrate, and/or the like. These may be used alone or in combination with each other.

The buffer layer 120 may be disposed on the substrate 110. The buffer layer 120 may prevent diffusion of metal atoms or impurities from the substrate 110 into the transistor TR. In an embodiment, for example, the buffer layer 120 may include an inorganic material such as silicon oxide, silicon nitride, and the like. These may be used alone or in combination with each other.

The active layer 130 may be disposed on the buffer layer 120. The active layer 130 may include a metal oxide semiconductor, an inorganic semiconductor (e.g., amorphous silicon and poly silicon), or an organic semiconductor. The active layer 130 may include a source region, a drain region, and a channel region positioned between the source region and the drain region.

The gate insulating layer 140 may be disposed on the buffer layer 120. The gate insulating layer 140 may sufficiently cover the active layer 130 on the substrate 110 and may have a substantially flat upper surface without creating a step around the active layer 130. Alternatively, the gate insulating layer 140 may cover the active layer 130 on the substrate 110 and may be disposed along the profile of the active layer 130 with a uniform thickness. In an embodiment, for example, the gate insulating layer 140 may include silicon oxide ($SiO_x$), silicon nitride ($SiN_x$), silicon carbide ($SiC_x$), silicon oxynitride ($SiO_xN_y$), silicon oxycarbide ($SiO_xC_y$), and/or the like. These may be used alone or in combination with each other.

The gate electrode 150 may be disposed on the gate insulating layer 140. The gate electrode 150 may overlap the channel region of the active layer 130 in a plan view. In an embodiment, for example, the gate electrode 150 may include a metal, an alloy, a metal nitride, a conductive metal oxide, a transparent conductive material, and/or the like. These may be used alone or in combination with each other.

The interlayer-insulating layer 160 may be disposed on the gate insulating layer 140. The interlayer-insulating layer 160 may sufficiently cover the gate electrode 150 on the substrate 110 and may have a substantially flat upper surface without creating a step around the gate electrode 150. Alternatively, the interlayer-insulating layer 160 may cover the gate electrode 150 on the substrate 110 and may be disposed along the profile of the gate electrode 150 with a uniform thickness. In an embodiment, for example, the interlayer-insulating layer 160 may include silicon oxide, silicon nitride, silicon carbide, silicon oxynitride, silicon oxycarbide, and/or the like. These may be used alone or in combination with each other.

The source electrode 170a and the drain electrode 170b may be disposed on the interlayer-insulating layer 160. The source electrode 170a may be connected to the source region of the active layer 130 through a contact hole penetrating a first part of the gate insulating layer 140 and the interlayer-insulating layer 160, and the drain electrode 170b may be connected to the drain region of the active layer 130 through a contact hole penetrating a second part of the gate insulating layer 140 and the interlayer-insulating layer 160. In an embodiment, for example, each of the source electrode 170a and the drain electrode 170b may include a metal, an alloy, a metal nitride, a conductive metal oxide, a transparent conductive material, and/or the like. These may be used alone or in combination with each other.

Accordingly, the transistor TR including the active layer 130, the gate electrode 150, the source electrode 170a, and the drain electrode 170b may be disposed in the display area DA on the substrate 110.

The planarization layer 180 may be disposed on the interlayer-insulating layer 160. The planarization layer 180 may sufficiently cover the source electrode 170a and the drain electrode 170b. The planarization layer 180 may include an organic material and/or an inorganic material. In an embodiment, the planarization layer 180 may include an organic material. In an embodiment, for example, the planarization layer 180 may include an organic material such as polyimide-based resin, photoresist, polyacryl-based resin, polyamide-based resin, siloxane-based resin, and/or the like. These may be used alone or in combination with each other.

The lower electrode 190 may be disposed on the planarization layer 180. The lower electrode 190 may be connected to the drain electrode 170b through a contact hole penetrating the planarization layer 180. In an embodiment, for example, the lower electrode 190 may include a metal, an alloy, a metal nitride, a conductive metal oxide, a transparent conductive material, and/or the like. These may be used alone or in combination with each other.

The pixel defining layer PDL may be disposed on the planarization layer 180. An opening exposing at least a part of an upper surface of the lower electrode 190 may be defined in the pixel defining layer PDL. The pixel defining layer PDL may include an organic material and/or an inorganic material. In an embodiment, for example, the pixel defining layer PDL may include an organic material such as a polyimide-based resin, a photoresist, a polyacrylic resin, a polyamide-based resin, a siloxane-based resin, and/or the like. These may be used alone or in combination with each other.

The light emitting layer 210 may be disposed on the lower electrode 190. The light emitting layer 210 may be disposed on the lower electrode 190 exposed by the opening. The light emitting layer 210 may be formed using at least one of light emitting materials capable of emitting red light, green light, and blue light. Alternatively, the light emitting layer 210 may emit white light as a whole by stacking a plurality of light emitting materials capable of generating different color lights such as red light, green light, and blue light.

The upper electrode 220 may be disposed on the pixel defining layer PDL and the light emitting layer 210. In an embodiment, for example, the upper electrode 220 may include a metal, an alloy, a metal nitride, a conductive metal oxide, a transparent conductive material, and/or the like. These may be used alone or in combination with each other.

Accordingly, the light emitting element 200 including the lower electrode 190, the light emitting layer 210, and the upper electrode 220 may be disposed on the substrate 110 in the display area DA.

The first thin film encapsulation layer 231 may be disposed on the upper electrode 220. The first thin film encapsulation layer 231 may prevent the light emitting layer 210 from being deteriorated due to penetration of moisture, oxygen, and/or the like. In addition, the first thin film encapsulation layer 231 may also perform a function of protecting the display panel DP from external impact. In an embodiment, for example, the first thin film encapsulation layer 231 may include inorganic materials having flexibility.

The second thin film encapsulation layer 232 may be disposed on the first thin film encapsulation layer 231. The second thin film encapsulation layer 232 may improve flatness of the display panel DP and protect the display panel DP. In an embodiment, for example, the second thin film encapsulation layer 232 may include flexible organic materials.

The third thin film encapsulation layer 233 may be disposed on the second thin film encapsulation layer 232. The third thin film encapsulation layer 233 together with the first thin film encapsulation layer 231 may prevent the light emitting layer 210 from being deteriorated due to penetration of moisture, oxygen, and/or the like. In addition, the third thin film encapsulation layer 233 may also perform a function of protecting the display panel DP from external shocks together with the first thin film encapsulation layer 231 and the second thin film encapsulation layer 232. In an embodiment, for example, the third thin film encapsulation layer 233 may include inorganic materials having flexibility.

Figure 10:
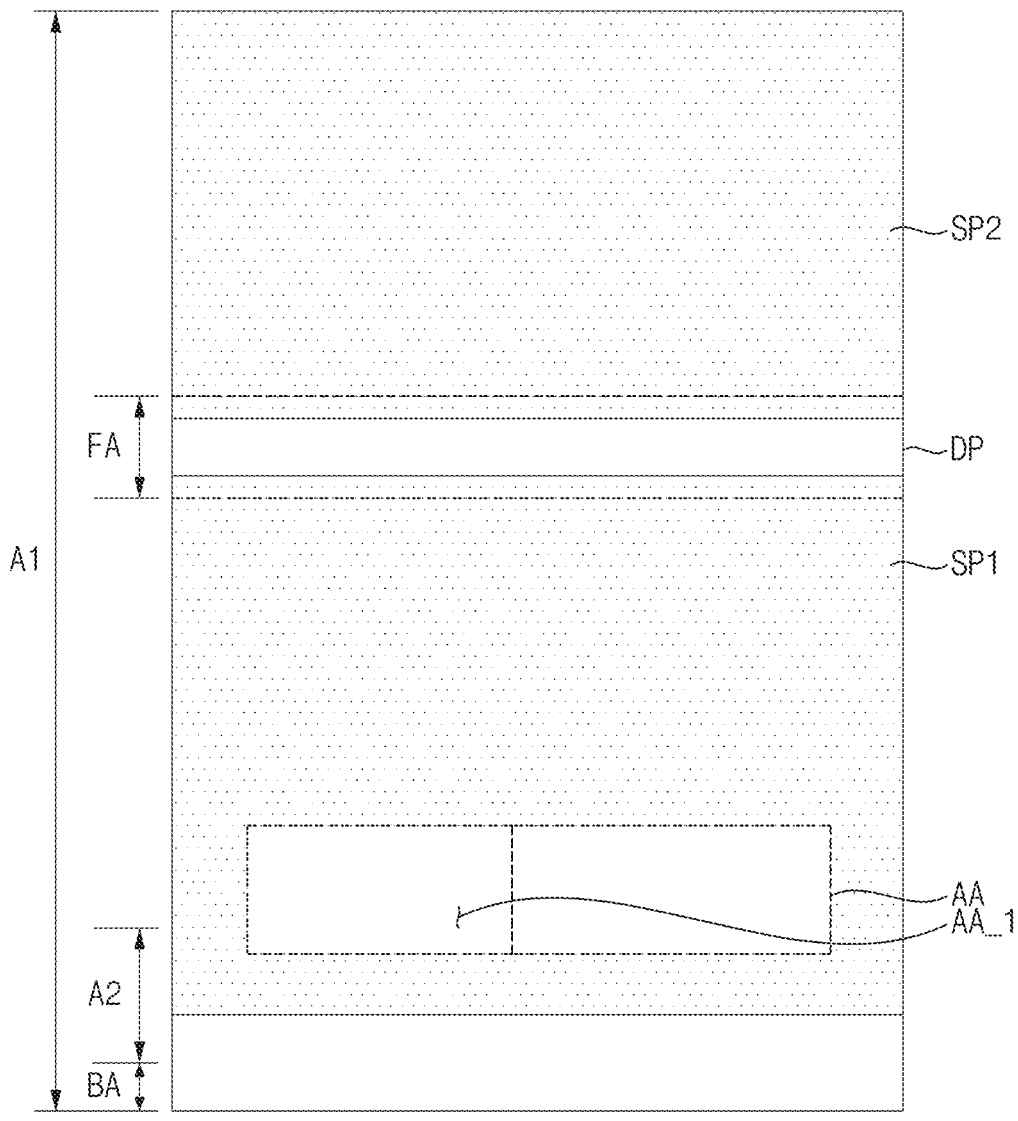
FIGS. 10 and 11 are bottom views illustrating an example of a display panel, a second support member, and a third support member of FIGS. 6 and 7.
Figure 11:
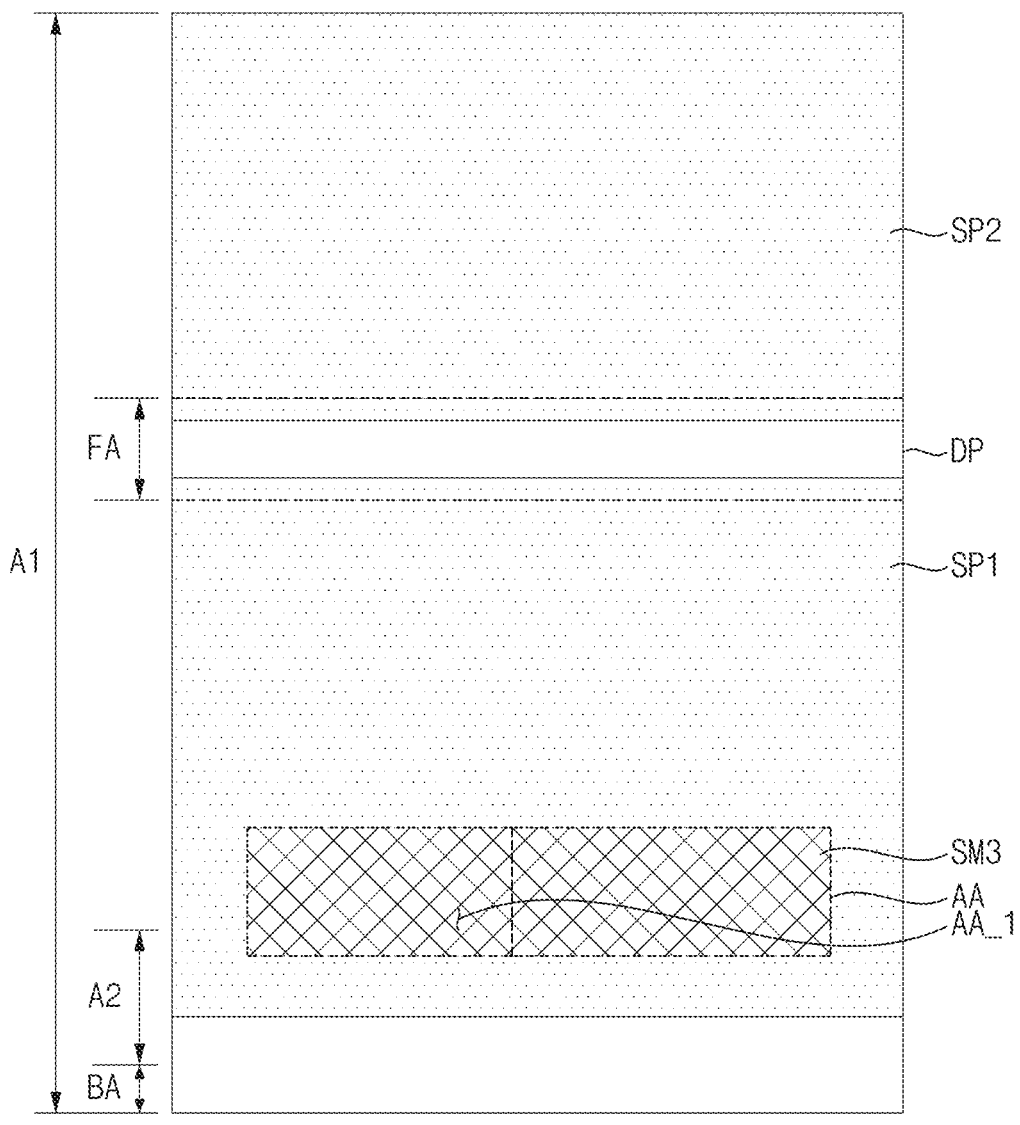

FIGS. 10 and 11 are bottom views illustrating an example of a display panel, a second support member, and a third support member of FIGS. 6 and 7.

Referring to FIGS. 6, 7, 10 and 11, a contact area AA may be defined in the display panel DP The contact area AA may be defined as an area overlapping a part where the circuit board CF contacts the third supporting member SM3 in a plan view. Here, a partial area AA_1 of the contact area AA may be defined as an area where the tape TP is attached to the third support member SM3.

The second support member SM2 may be disposed under the display panel DP. As described above, when the bending area BA is bent, the second panel area A2 may be positioned under the first panel area A1. Accordingly, when the bending area BA is bent, the second support member SM2 may overlap the first panel area A1 and the second panel area A2. However, the second support member SM2 may not overlap the contact area AA.

The third support member SM3 may be disposed under the display panel DP. In an embodiment, for example, the third support member SM3 may be disposed to overlap only the contact area AA. In this case, the third support member SM3 may partially overlap the tape TP in the plan view.

Figure 12:
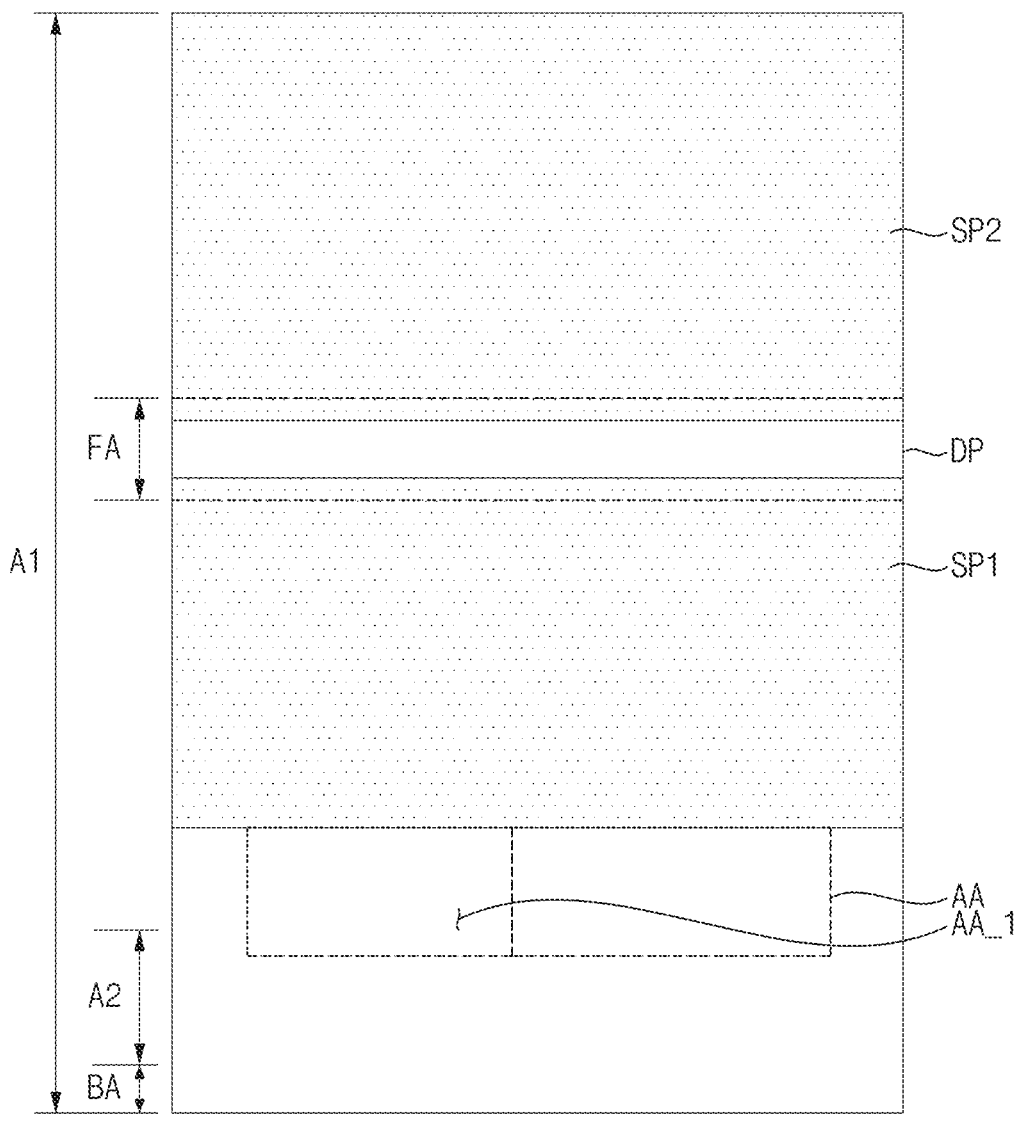
FIGS. 12 and 13 are bottom views illustrating another example of a display panel, a second support member, and a third support member of FIGS. 6 and 7.
Figure 13:
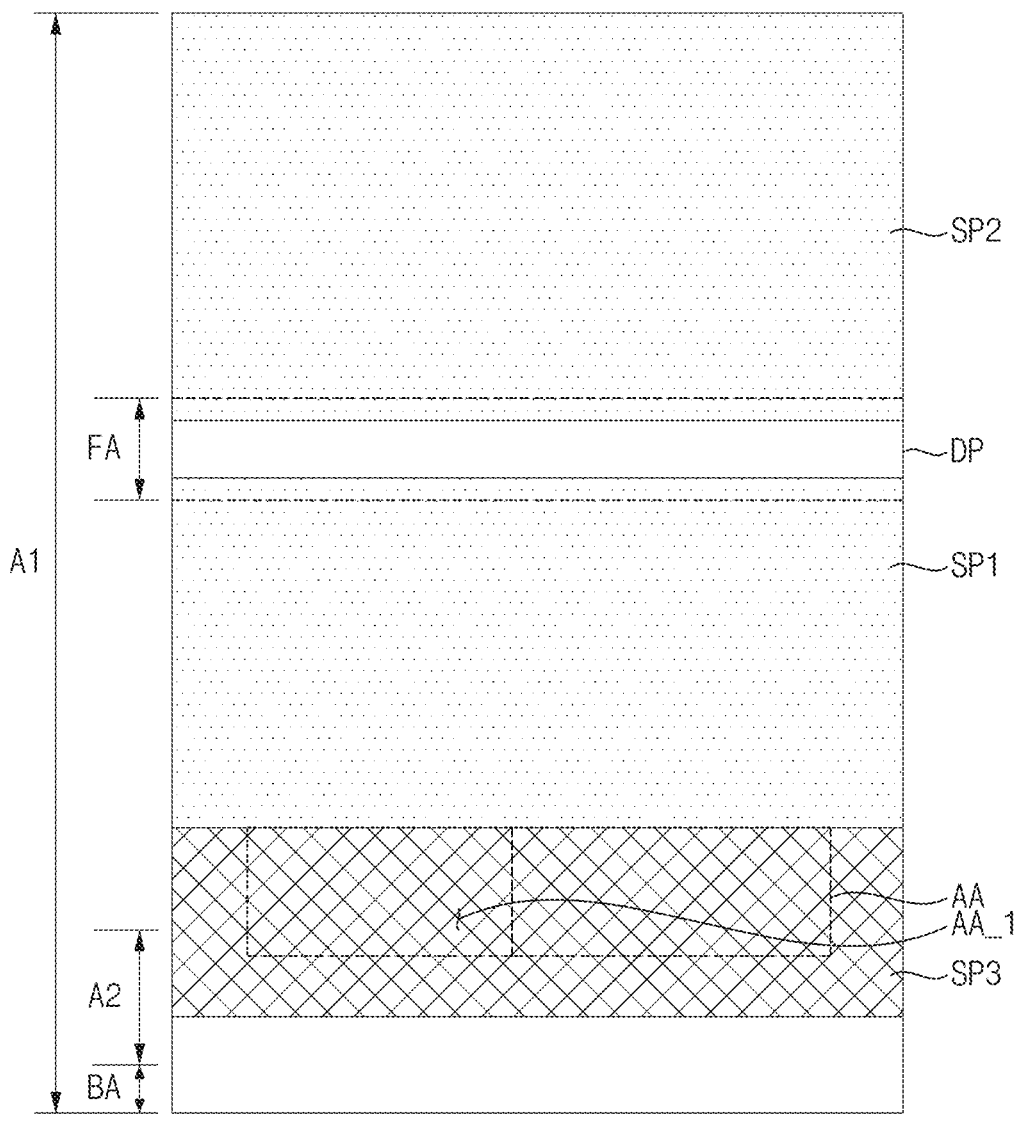

FIGS. 12 and 13 are bottom views illustrating another example of a display panel, a second support member, and a third support member of FIGS. 6 and 7.

Hereinafter, descriptions overlapping those described with reference to FIGS. 10 and 11 will be omitted or simplified.

Referring to FIGS. 6, 7, 12, and 13, the second support member SM2 may be disposed under the display panel DP. In an embodiment, for example, the second support member SM2 may overlap only the first panel area A1 and may not overlap the second panel area A2.

The third support member SM3 may be disposed under the display panel DP. In an embodiment, for example, the third support member SM3 may overlap the entirety of the contact area AA. That is, the third support member SM3 may completely cover the contact area AA. In this case, the third support member SM3 may partially overlap the tape TP in the plan view.

Figure 14:
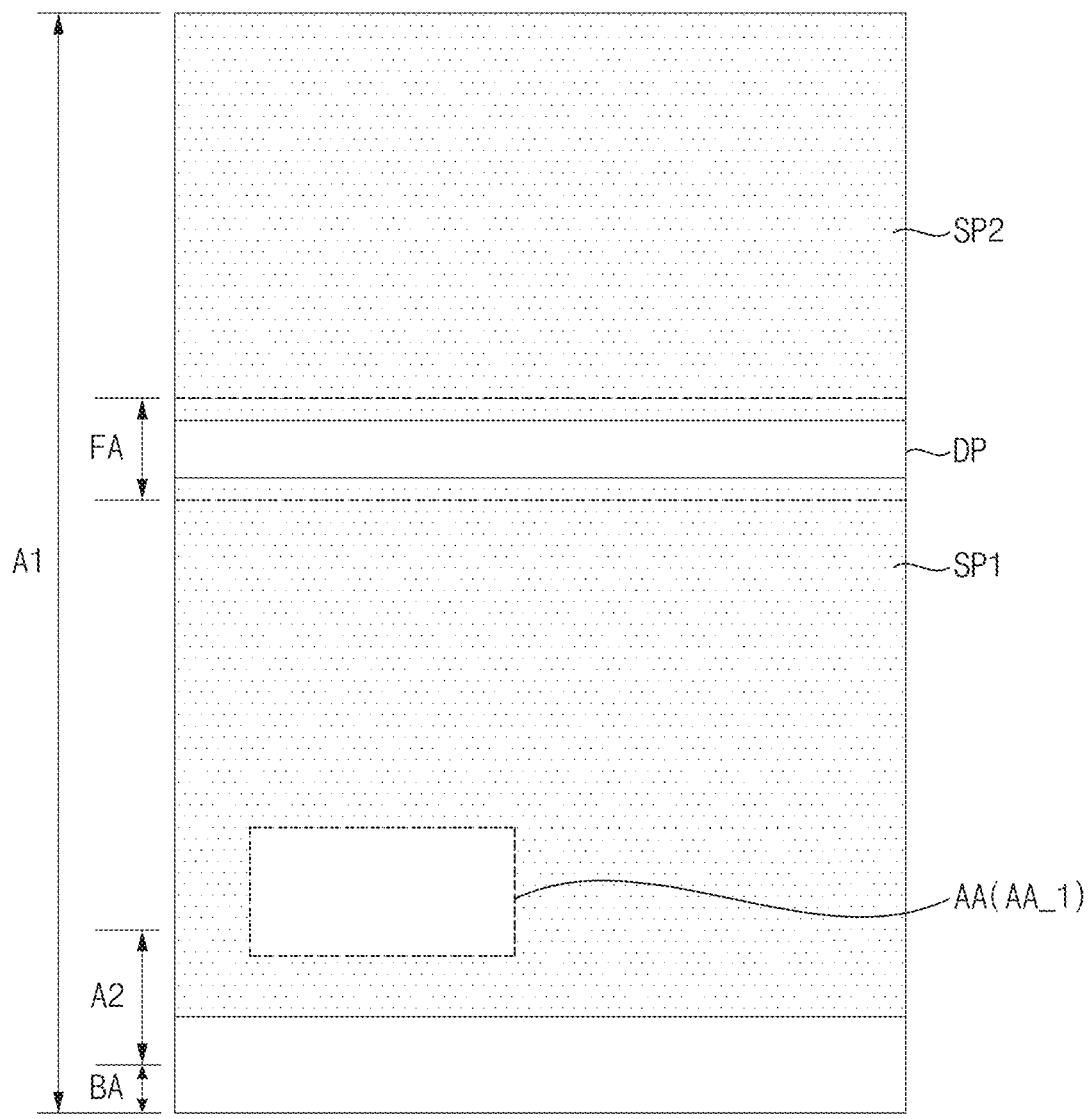
FIGS. 14 and 15 are bottom views illustrating still another example of a display panel, a second support member, and a third support member of FIGS. 6 and 7.
Figure 15:
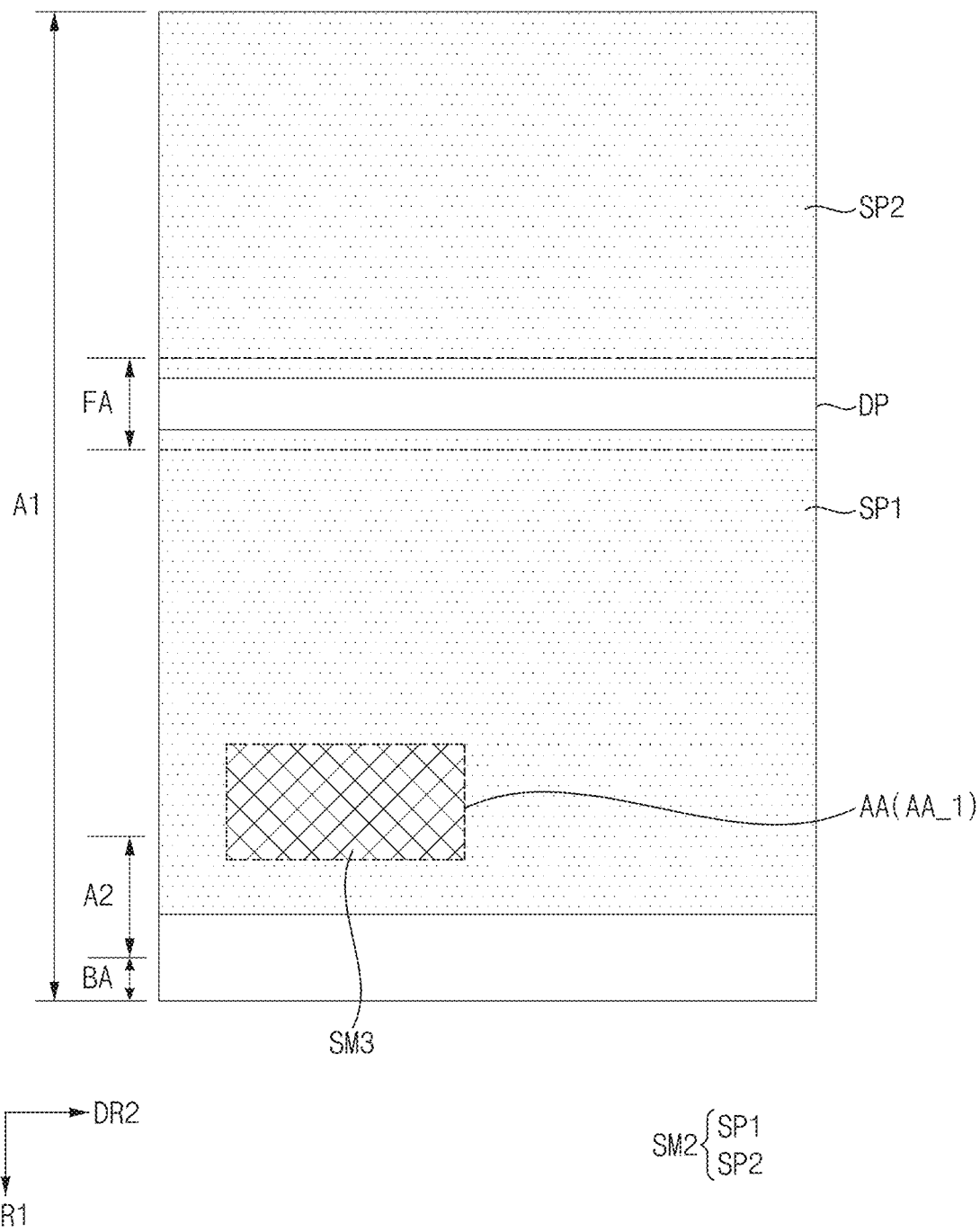

FIGS. 14 and 15 are bottom views illustrating still another example of a display panel, a second support member, and a third support member of FIGS. 6 and 7.

Hereinafter, descriptions overlapping those described with reference to FIGS. 10 and 11 will be omitted or simplified.

Referring to FIGS. 6, 7, 14, and 15, the second support member SM2 may be disposed below the display panel DP. In an embodiment, for example, the second support member SM2 may overlap the first panel area A1 and the second panel area A2.

The third support member SM3 may be disposed under the display panel DP. In an embodiment, for example, the third support member SM3 may be disposed to overlap only the partial area AA_1 in the contact area AA. In this case, the partial area AA_1 is equal to the contact area AA, and the entirety of the third support member SM3 may overlap the tape TP in the plan view.

The present disclosure can be applied to various display devices. For example, the present disclosure is applicable to various display devices such as display devices for vehicles, ships and aircraft, portable communication devices, display devices for exhibition or information transmission, medical display devices, and the like.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the present invention. Accordingly, all such modifications are intended to be included within the scope of the present invention as defined in the claims. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims.

What is claimed is:

1. A display device comprising:
 a display panel including a foldable area having flexibility;
 a first support member disposed under the display panel and including a stretchable portion overlapping the foldable area;
 a second support member disposed under the first support member and including a first support plate and a second support plate spaced apart from each other;
 a third support member disposed under the first support member and including a material different from a material of the second support member; and
 a circuit board contacting a part of the display panel and a first surface of the third support member, respectively.

2. The display device of claim 1, wherein the third support member does not overlap the second support member in a plan view.

3. The display device of claim 1, wherein the third support member is positioned on a same plane as the second support member.

4. The display device of claim 1, wherein the third support member contacts the second support member.

5. The display device of claim 1, further comprising:
 a tape disposed between the first support member and the third support member and contacting a second surface of the third support member, which is different from the first surface.

6. The display device of claim 5, wherein the third support member at least partially overlaps the tape in a plan view.

7. The display device of claim 5, wherein an entirety of the third support member overlap the tape in a plan view.

8. The display device of claim 5, wherein the tape includes an insulating material or a conductive material.

9. The display device of claim 1, wherein a surface of the third support member is coated with a conductive material.

10. The display device of claim 9, wherein the conductive material includes at least one selected from a group consisting of conductive polymer and a conductive rubber.

11. The display device of claim 1, wherein each of the second and third support members includes at least one selected from a group consisting of stainless steel (SUS), aluminum (Al), copper (Cu) alloy, and titanium (Ti) alloy.

12. The display device of claim 1, wherein a plurality of openings spaced apart from each other are defined in the stretchable portion.

13. The display device of claim 12, wherein each of the plurality of openings extends in a first direction and the plurality of openings are arranged along the first direction and a second direction crossing the first direction.

14. The display device of claim 1, wherein the circuit board includes a flexible printed circuit board (FPCB).

15. A display device comprising:
- a display panel including:
  - a display area including a foldable area having flexibility, a pad area positioned in one side of the display area, and a bending area positioned between the display area and the pad area;
- a plurality of pad electrodes disposed in the pad area on the display panel;
- a first support member disposed under the display panel and including a stretchable portion overlapping the foldable area;
- a second support member disposed under the first support member and including a first support plate and a second support plate spaced apart from each other;
- a third support member disposed under the first support member and including a metal material different from a metal material of the second support member; and
- a circuit board including a first part contacting the pad electrodes and a second part directly contacting a first surface of the third support member.

16. The display device of claim 15, wherein the third support member does not overlap the second support member in a plan view.

17. The display device of claim 15, wherein the third support member is positioned on a same plane as the second support member.

18. The display device of claim 15, wherein the third support member contacts the second support member.

19. The display device of claim 15, further comprising:
- a tape disposed between the first support member and the third support member and contacting a second surface of the third support member, which is different from the first surface.

20. The display device of claim 19, wherein the third support member at least partially overlaps the tape in a plan view.

21. The display device of claim 19, an entirety of the third support member overlap the tape in a plan view.

22. The display device of claim 19, wherein the tape includes an insulating material or a conductive material.

23. The display device of claim 14, wherein a surface of the third support member is coated with a conductive material.

24. The display device of claim 23, wherein the conductive material includes at least one selected from a group consisting of conductive polymer and a conductive rubber.

25. The display device of claim 15, wherein each of the second and third support members includes at least one selected from a group consisting of stainless steel, aluminum, copper alloy, and titanium alloy.

* * * * *